May 12, 1959
L. J. KRAEMER
2,886,340
CARRIAGE WITH REVERSIBLE BODY
Filed Feb. 28, 1957
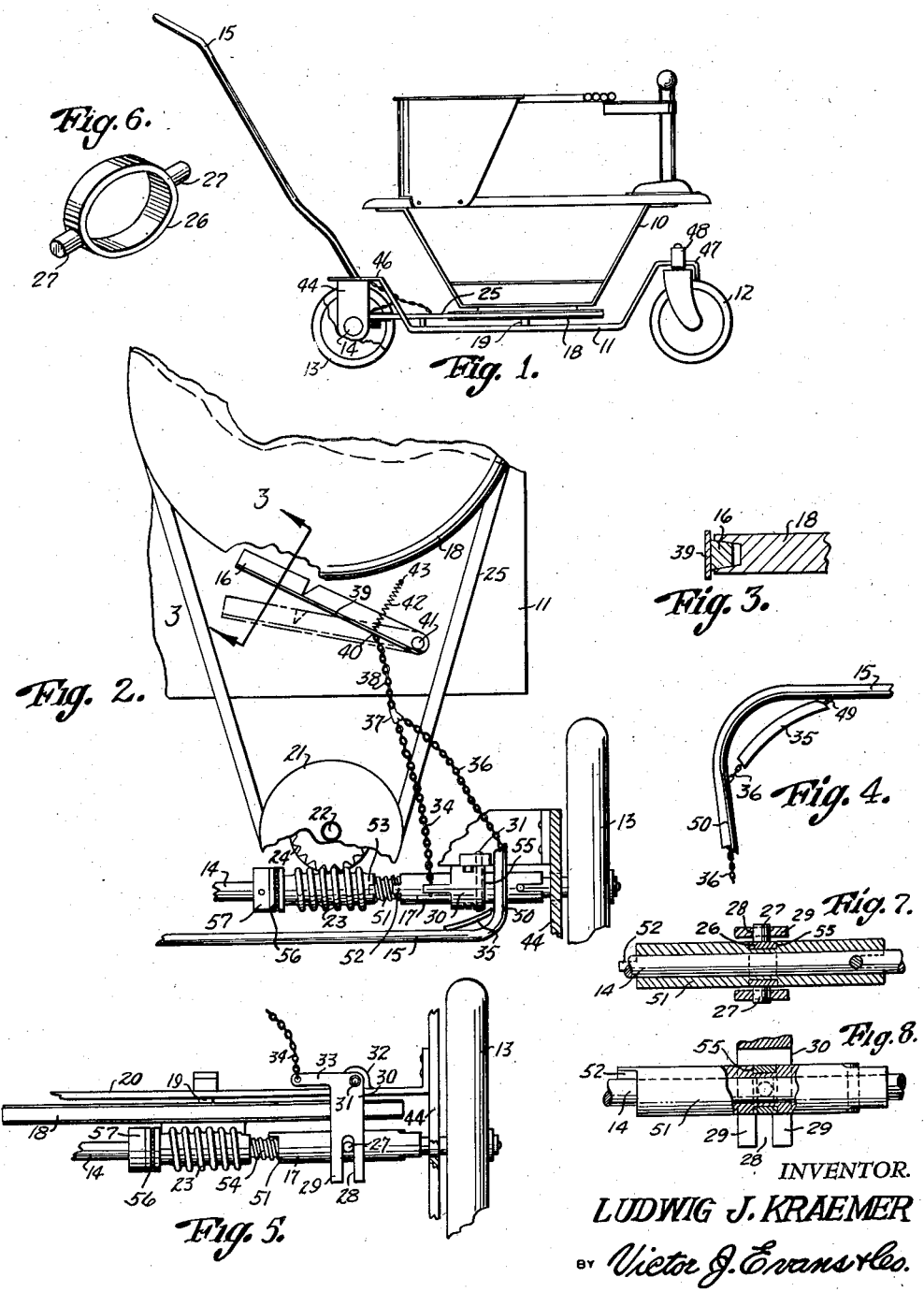
INVENTOR.
LUDWIG J. KRAEMER
BY *Victor J. Evans & Co.*
ATTORNEYS

United States Patent Office 2,886,340
Patented May 12, 1959

2,886,340

CARRIAGE WITH REVERSIBLE BODY

Ludwig J. Kraemer, Decatur, Ill.

Application February 28, 1957, Serial No. 643,003

2 Claims. (Cl. 280—47.39)

This invention relates to perambulators, baby carriages, and the like wherein the body of the carriage is mounted on front and rear wheels, and in particular a perambulator having a body pivotally mounted on a chassis and adapted to be rotated from the rear wheels through a transmission assembly including a belt trained over pulleys and a worm and gear whereby upon actuating the brake and clutch by a control lever on a handle the body of the perambulator may be turned whereby an infant therein may face the front, rear, or either side.

The purpose of this invention is to provide means for turning the body of a perambulator from a handle thereof whereby an infant therein may face any direction desired or wherein the body may rotate continuously with travel of the perambulator.

In numerous instances it is desirable to turn a child in a perambulator so that the child is not looking into the rays of the sun or of bright lights or whereby the attention of the child may be attracted to a particular display and with the conventional perambulator it is necessary to adjust the positions of cushions in the perambulator and even then the angle through which the face of the infant may be adjusted is limited. With this thought in mind this invention contemplates a perambulator wherein the body is mounted on a turntable and wherein the turntable is adapted to be actuated from the handle of the perambulator so that the position of the child is readily adjustable.

The object of this invention is, therefore, to provide means for adjusting the position of the body of a perambulator as the perambulator is in motion.

Another object of the invention is to provide means for turning the body of a perambulator by wheels of the perambulator wherein the motion of the body is controlled from the handle of the perambulator.

A further object of the invention is to provide transmission and control instrumentalities on a perambulator or baby carriage whereby the body of the baby carriage or perambulator may be rotated in which the perambulator is of simple and economical construction.

With these and other objects and advantages in view the invention embodies a chassis having front and rear wheels and a handle extended from one end, a horizontally disposed pulley rotatably mounted on the chassis and operatively connected to the rear wheels and a body, such as that of a baby carriage or perambulator mounted on the pulley and having cushioning means for an infant therein.

Other features and advantages of the invention will appear from the following description taken in connection with the drawing, wherein:

Figure 1 is a side elevational view of the improved perambulator with parts broken away showing the interior of the body and the mounting of one of the wheels.

Figure 2 is a sectional plan with parts broken away and with the parts shown on an enlarged scale showing the transmission elements and clutch whereby the body of the perambulator is rotated by a worm gear on the rear axle.

Figure 3 is a cross section taken on line 3—3 of Fig. 2 with the parts shown on a further enlarged scale illustrating the brake that coacts with a horizontally disposed pulley on the chassis of the perambulator.

Figure 4 is a view showing a corner at one side of the handle showing a control lever for actuating the brake and clutch.

Figure 5 is an elevational view looking toward one side of the rear axle of the perambulator with the parts as shown in Fig. 2 and with parts broken away.

Figure 6 is a view showing the clutch collar.

Figure 7 is a longitudinal section through the clutch assembly on the axle showing the mounting of the clutch collar in a sleeve on the shaft, the sleeve being shown in section and the shaft in elevation.

Figure 8 is a side elevational view illustrating the connection of the clutch collar to the sleeve mounted on the shaft with part of the sleeve and clutch collar shown in section.

Referring now to the drawing wherein like reference characters denote corresponding parts the improved perambulator of this invention includes a body 10, which may be of any suitable type or design, a chassis 11 having caster-type front wheels 12 and rear wheels 13 fixedly mounted on an axle 14, a handle 15 extended upwardly from the axle 14, a brake 16 and a clutch 17.

The body 10 is mounted on a horizontally disposed pulley 18 that is rotatably mounted on the chassis with a vertically disposed shaft 19 rotatably mounted in a transversely disposed strut 20, and the pulley 18 is in a horizontal plane with a smaller pulley 21 that is mounted on a shaft 22 and that is rotated from the rear axle 14 through a worm 23, a worm gear 24 and clutch 17. The pulley 18 is rotated by the pulley 21 through a belt 25 that is trained over the pulleys as shown in Fig. 2.

The clutch 17 is provided with a sliding sleeve 51 actuated by a collar 26 having pins 27 extended at the sides, and the pins are positioned to extend into slots 28 of forks 29 on lower ends of arms of a bell crank or yoke 30 that is pivotally mounted by a pin 31 on a lug 32 of the chassis. The yoke 30 is provided with an arm 33 to which a small chain or cable 34 is attached and, as shown in Fig. 2 the chain is connected to a control lever 35 in an upper corner of the handle 15, by a chain 36.

The chain 36 is also connected by a joint 37 to a chain 38 that is connected to a lever 39 of the brake 16 at the point 40 and with the lever 39 pivotally mounted on the chassis 11 by a pin 41 a force applied to the chain 36 first withdraws the brake 16 and then actuates the yoke 30 to slide the clutch element tooth 52 of the sleeve 51 into engagement with a notch 53 in the end of the worm 23 whereby the worm 23 rotates the gear 24 and body 10 through the belt 25 and pulleys 21 and 18.

The brake 16 is urged into engagement with the pulley 18 for preventing rotation of the pulley by a spring 42 that is attached to the chassis 11 at the point 43, at one end and to the lever 39 at the point 40, at the opposite end.

The axle 14 is rotatably mounted in depending arms 44 of an inverted U-shaped frame 45 upon which extended ends 46 of the chassis 11 are secured, such as by welding and upwardly extended ends 47 of the chassis, at the opposite end are secured to a mounting element 48 in which the casters 12 are rotatably mounted.

The control lever or element 35 includes a tube or sleeve, of rubber or other elastic material positioned over the chain 36 and, as illustrated in Fig. 4, the chain is attached to the handle 15 at the point 49 and extends through a side member 50 of the handle.

With the parts designed and assembled as illustrated and described an attendant or operator gripping the control lever 35 draws the chain 36 upwardly, drawing the feeder chains 34 and 38 whereby the brake 16 is first disengaged from the pulley 18 and a clutch sleeve 51 is actuated whereby a tooth 52 on the sleeve 51 moves into engagement with a notch 53 in the worm 23 whereby the worm which is rotated by the shaft rotates the gear 24 and body 10 through the pulleys 18 and 21 and the belt 25. Upon release of the control lever 35 the spring 42 draws the brake 16 into engagement with the pulley and a spring 54 disengages the clutch elements. The collar 26 from which the pins 27 of the clutch extend is mounted to rotate in an annular slot 55 in the sleeve 51. One end of the hub of the worm 23 is positioned to engage a thrust bearing 56 that is retained in position on the shaft 14 by a set collar 57. By this means an operator of the perambulator may cause the body portion thereof to turn to any suitable angle or the body may rotate continuously as the vehicle travels.

It will be understood that modifications, within the scope of the appended claims, may be made in the design and arrangement of the parts without departing from the spirit of the invention.

What is claimed is:

1. In a perambulator, the combination which comprises a chassis, a caster on the forward end of the chassis, a transversely disposed axle mounted on the rear portion of the chassis, wheels fixedly secured on ends of the axle, a worm freely mounted on the axle and having a clutch element, a second clutch element rotatable with and slidably mounted on the axle and engageable with the first clutch element for operatively connecting the worm to the axle, a worm gear mounted on the chassis and positioned to mesh with the worm of the axle, a pulley operatively connected to the worm gear, a pulley mounted on the chassis and positioned in a common horizontal plane with that of the pulley operatively connected to the worm gear, a belt trained over the pulleys for rotating the pulley on the chassis, a body carried by the pulley on the chassis, a handle extended from the chassis, and control means mounted on the handle and operatively connected to the slidable clutch element for engaging the clutch elements to rotate the body.

2. In a perambulator, the combination which comprises a chassis, a caster on the forward end of the chassis, a transversely disposed axle mounted on the rear portion of the chassis, wheels fixedly secured on ends of the axle, a worm freely mounted on the axle and having a clutch element, a second clutch element rotatable with and slidably mounted on the axle and engagable with the first clutch element for operatively connecting the worm to the axle, a worm gear mounted on the chassis and positioned to mesh with the worm of the axle, a pulley operatively connected to the worm gear, a pulley mounted on the chassis and positioned in a common horizontal plane with that of the pulley operatively connected to the worm gear, a belt trained over the pulleys for rotating the pulley on the chassis, a body carried by the pulley on the chassis, a handle extended from the chassis, a brake mounted on the chassis and positioned to engage the pulley positioned on the chassis, and control means on the handle and connected to the brake and slidable clutch element for releasing the brake and operating the clutch to rotate the pulley and body.

References Cited in the file of this patent

UNITED STATES PATENTS

| | | |
|---|---|---|
| 716,285 | St. Clair | Dec. 16, 1902 |
| 1,642,591 | Morris | Sept. 13, 1927 |